(12) United States Patent
Clark et al.

(10) Patent No.: US 10,083,004 B2
(45) Date of Patent: *Sep. 25, 2018

(54) USING VOICE-BASED WEB NAVIGATION TO CONSERVE CELLULAR DATA

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,855

(22) Filed: Sep. 24, 2015

(65) Prior Publication Data

US 2016/0179465 A1     Jun. 23, 2016

Related U.S. Application Data

(63) Continuation of application No. 14/575,235, filed on Dec. 18, 2014.

(51) Int. Cl.
*G06F 17/21* (2006.01)
*G06F 17/27* (2006.01)
*G10L 21/00* (2013.01)
*G10L 25/00* (2013.01)
*G06F 3/16* (2006.01)
(Continued)

(52) U.S. Cl.
CPC ............. *G06F 3/167* (2013.01); *G06F 17/20* (2013.01); *G06F 17/30887* (2013.01); *G10L 15/1822* (2013.01); *G10L 15/22* (2013.01); *G10L 15/26* (2013.01); *H04L 67/02* (2013.01); *H04L 69/22* (2013.01); *H04W 4/16* (2013.01)

(58) Field of Classification Search
CPC .... G06F 17/21; G06F 17/27; G06F 17/30864; G06F 17/30873; G06F 17/2785; G06F 17/30976; G10L 15/22; G10L 15/18; G10L 15/1822; G10L 15/30; G10L 2015/223
USPC ................................ 704/235, 246, 270–275
See application file for complete search history.

(56) References Cited

U.S. PATENT DOCUMENTS 6,513,063 B1* 1/2003 Julia ....................... G06F 9/465
                                                   707/E17.071
6,724,868 B2    4/2004 Pradhan et al.
(Continued)

OTHER PUBLICATIONS

High et al, "Transforming the way organizations think with cognitive systems,", 2012, IBM Academy of Technology (2102), 2012, pp. 1-5.*

(Continued)

*Primary Examiner* — Olujimi Adesanya
(74) *Attorney, Agent, or Firm* — Patterson + Sheridan, LLP

(57) ABSTRACT

Techniques disclose methods for providing voice-based web navigation through a cellular voice connection. A voice command a request to return content of a webpage having one or more topics is received via a cellular voice connection. One or more of the topics of the webpage that match the content specified in the request is identified. An audio indication of the content is returned via the cellular voice connection.

7 Claims, 6 Drawing Sheets

(51) Int. Cl.

| | | |
|---|---|---|
| G10L 15/26 | (2006.01) | |
| G10L 15/22 | (2006.01) | |
| G10L 15/18 | (2013.01) | |
| H04W 4/16 | (2009.01) | |
| G06F 17/20 | (2006.01) | |
| G06F 17/30 | (2006.01) | |
| H04L 29/08 | (2006.01) | |
| H04L 29/06 | (2006.01) | |

(56) References Cited

U.S. PATENT DOCUMENTS

| | | | | |
|---|---|---|---|---|
| 6,985,865 | B1* | 1/2006 | Packingham | G10L 15/22 704/270.1 |
| 7,069,014 | B1* | 6/2006 | Thenthiruperai | H04L 29/06027 370/352 |
| 7,330,815 | B1* | 2/2008 | Jochumson | G10L 15/30 704/231 |
| 7,640,163 | B2 | 12/2009 | Charney et al. | |
| 8,032,577 | B2 | 10/2011 | Danner et al. | |
| 8,219,599 | B2* | 7/2012 | Tunstall-Pedoe | G06F 17/30654 707/603 |
| 8,331,542 | B2 | 12/2012 | Crausaz et al. | |
| 8,566,102 | B1* | 10/2013 | Bangalore | G10L 15/22 704/270.1 |
| 8,909,528 | B2* | 12/2014 | Eide | G10L 15/187 704/231 |
| 9,244,911 | B2* | 1/2016 | Allen | G06F 17/2785 |
| 2001/0049603 | A1* | 12/2001 | Sravanapudi | G06F 17/30899 704/270.1 |
| 2002/0095330 | A1 | 7/2002 | Berkowitz et al. | |
| 2003/0125953 | A1* | 7/2003 | Sharma | G06F 17/30905 704/270 |
| 2004/0083092 | A1* | 4/2004 | Valles | G06F 17/271 704/9 |
| 2004/0172254 | A1* | 9/2004 | Sharma | A61K 8/411 704/270.1 |
| 2004/0176954 | A1* | 9/2004 | Wang | G06F 3/16 704/254 |
| 2006/0069570 | A1* | 3/2006 | Allison | G06F 17/30654 704/270 |
| 2006/0195593 | A1* | 8/2006 | Shiraki | H04L 29/06027 709/227 |
| 2006/0235696 | A1* | 10/2006 | Bennett | G06F 17/27 704/270.1 |
| 2006/0287907 | A1* | 12/2006 | Kim | G06Q 10/00 705/7.32 |
| 2007/0094285 | A1* | 4/2007 | Agichtein | G06F 17/30398 |
| 2007/0208732 | A1* | 9/2007 | Flowers | G06F 17/30867 |
| 2007/0213980 | A1* | 9/2007 | Danner | G06Q 20/16 704/231 |
| 2009/0172108 | A1 | 7/2009 | Singh | |
| 2010/0250243 | A1* | 9/2010 | Schalk | G10L 15/22 704/201 |
| 2011/0015928 | A1* | 1/2011 | Odell | G10L 15/30 704/257 |
| 2011/0320187 | A1* | 12/2011 | Motik | G06F 17/278 704/9 |
| 2012/0078837 | A1* | 3/2012 | Bagchi | A61B 5/00 706/52 |
| 2012/0101807 | A1* | 4/2012 | Heo | G06F 17/30657 704/9 |
| 2012/0155296 | A1* | 6/2012 | Kashanian | H04L 12/1417 370/252 |
| 2012/0224481 | A1* | 9/2012 | Babiarz | H04L 43/0876 370/230.1 |
| 2012/0271643 | A1* | 10/2012 | Da Palma | G10L 15/22 704/275 |
| 2013/0054250 | A1 | 2/2013 | Nanavati et al. | |
| 2013/0132308 | A1* | 5/2013 | Boss | G06F 17/30976 706/12 |
| 2013/0173597 | A1* | 7/2013 | Do | G06F 9/5011 707/722 |
| 2013/0231080 | A1* | 9/2013 | Cheuk | H04M 15/765 455/405 |
| 2014/0006012 | A1* | 1/2014 | Zhou | G06F 17/30654 704/9 |
| 2014/0172897 | A1* | 6/2014 | Nakakura | G06F 17/30923 707/758 |
| 2015/0019228 | A1* | 1/2015 | Akolkar | G06F 17/30684 704/270.1 |
| 2015/0140981 | A1* | 5/2015 | Balasaygun | H04W 4/24 455/418 |
| 2015/0143241 | A1* | 5/2015 | Zeigler | G06F 3/167 715/728 |
| 2016/0119377 | A1* | 4/2016 | Goldberg | G06F 17/27 726/12 |
| 2016/0179788 | A1* | 6/2016 | Clark | G06F 17/21 704/9 |

OTHER PUBLICATIONS

Andrenucci et al, "Automated question answering: review of the main approaches," 2005, InThird International Conference on Information Technology and Applications (ICITA'05), 2005, pp. 514-519 vol. 1.*

Mehrez et al, "Who discovered the electron neutrino? a telephony-based distributed open-source standard-compliant spoken dialog system for question answering", 2013, In Proc. of the GSCL, Darmstadt, Germany, pp. 1-5.*

Ferrucci et al, "Building Watson: an overview of the DeepQA Project", 2010, In AI Magazine, pp. 59-79.*

Hu et al, "SpeechQoogle: An Open-Domain Question Answering System with Speech Interface", 2006, In ISCSLP 2006, pp. 1-12.*

IBM "List of IBM Patents or Patent Applications Treated as Related".

* cited by examiner

USING VOICE-BASED WEB NAVIGATION TO CONSERVE CELLULAR DATA

CROSS-REFERENCE TO RELATED APPLICATIONS

This application is a continuation of co-pending U.S. patent application Ser. No. 14/575,235, filed Dec. 18, 2014. The aforementioned related patent application is herein incorporated by reference in its entirety.

BACKGROUND

Embodiments disclosed herein generally relate to web browsing on mobile devices, and more specifically, using a cognitive natural language processing system to provide voice-based web navigation via a phone service.

Mobile telephones, computing tablets, and wearable devices allow users to access digital content (e.g., web pages) over a cellular data network. Further, advances in telecommunications allow such data networks to provide data access at increasing speeds. As a result, users can access data-intensive network services on a mobile device with relative ease.

As a practical matter, most telecommunications providers charge subscribers for access to the cellular data network. For example, telecommunications providers offer data plans that allow a subscriber with a fixed amount of data over a given period of time, such as 2 GB per month, 4 GB per month, and so on. Typically, if the user approaches the usage limit specified in a subscribed data plan, then the telecommunications provider blocks the user from accessing further data over the cellular data network or charges extra fees for data that exceeds the limit.

SUMMARY

One embodiment presented herein discloses a method. The method generally includes receiving, via a cellular voice connection, a voice command representing a request to return content of a web page having one or more topics. The method also includes identifying one or more of the topics of the web page that match the content specified in the request. An audio indication of the content is returned.

DETAILED DESCRIPTION

Figure 1:
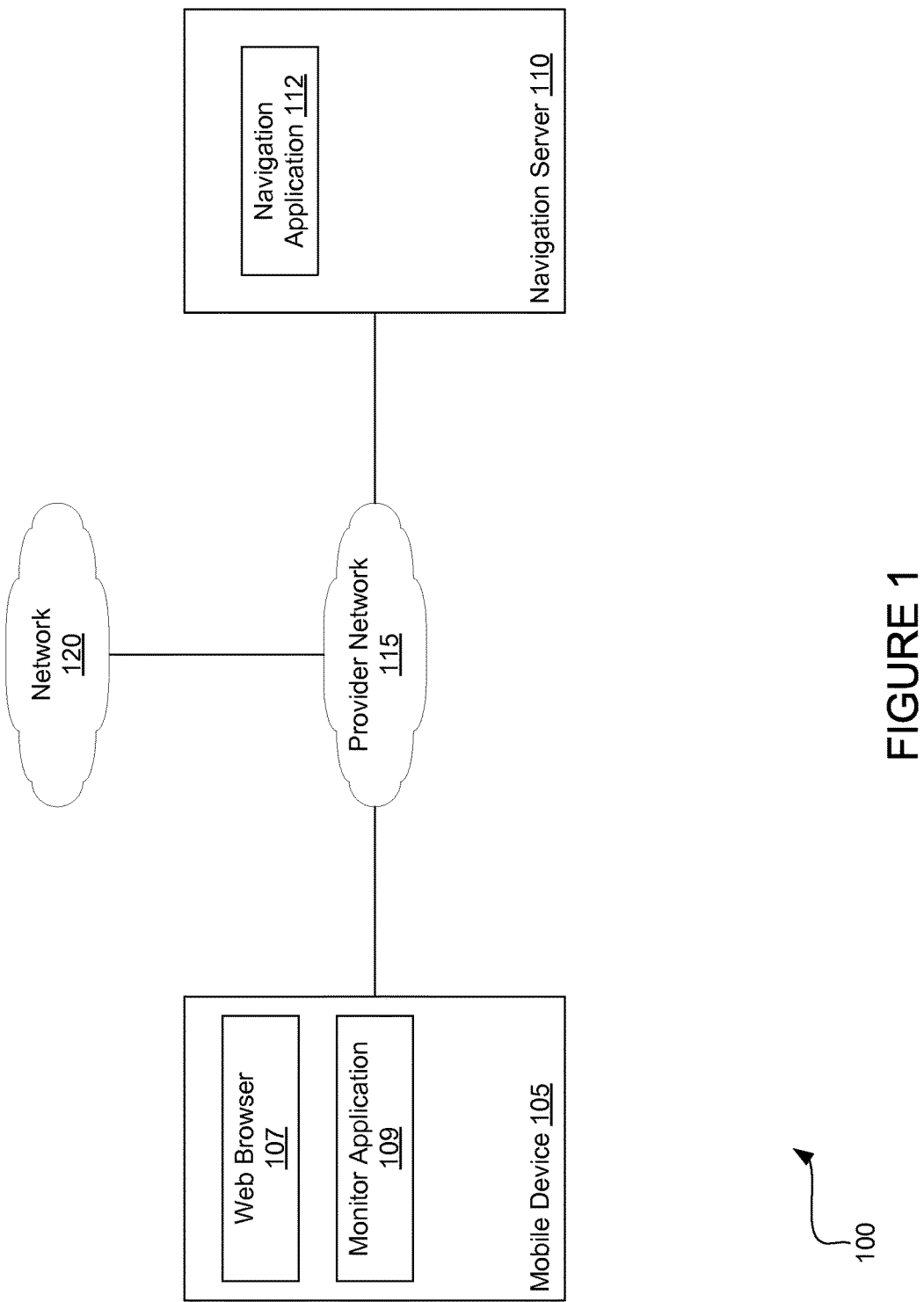
FIG. 1 illustrates an example computing environment, according to one embodiment.

Embodiments presented herein describe techniques for conserving cellular data usage through voice-based web navigation. In one embodiment, an application executing on a mobile device monitors data usage on that device, such as a user accessing a web site via a mobile phone or tablet. The monitoring application can detect when the data usage approaches a data limit. When this occurs, the monitoring application may prompt the user requesting whether to access a voice-based web navigation service. Further, the monitoring application can forward information (e.g., a web site URL currently being viewed on the web browser, the phone number associated with the mobile device, an identifier associated with the user, etc.) to the web navigation service.

In response, the user may request to initiate a voice-based web navigation session. That is, the user may call the service using the mobile device to initiate the session. The navigation service, upon receiving the call, can identify the web page the user was browsing from information forwarded to the service. Alternatively, the user can provide a voice command to the navigation service to access a web site, e.g., "Go to <desired web site>." In such a case, voice recognition may be used to identify the website. The navigation service may ingest the contents of the website, allowing the user to navigate content on that site (and on other sites linked to by the web site) using verbal commands. In one embodiment, the navigation service uses natural language processing (NLP) techniques to process content and structure provided by the web page. Doing so allows the navigation service to match content on the site with desired information specified in a voice command by the user.

For example, assume that the user accesses a news web site through the navigation service. The navigation service, using various NLP techniques, can evaluate content such as headers, headlines, and article content presented on the current page of the web site. The navigation service can then communicate, via audio, the web page content to the user in such a manner to allow the user to issue voice commands to navigate through the web page in response. For instance, the navigation service may provide a voice prompt to the user by reading what sections, topics, or concepts are available on a home page of the news web site, e.g., "Top Headlines, Global News, National News, Sports, Op-Ed, Classified." In response, the user can issue a voice command to navigate through the web page based on the options provided in the voice prompt. The navigation service can apply voice recognition and NLP techniques to identify the command and a requested target location on the web page. For example, assume the user says, "Read the top headlines." In response, the navigation service can identify that the user desires to hear article headlines listed under the Top Headlines section of a website. Similarly, a user may ask questions about whether content is available, e.g., "Are there any articles about the playoffs?" Thereafter, the navigation service may read the article headlines to the user. The user may then issue additional voice commands, e.g., requesting that the navigation service read one of the articles mentioned, requesting that the navigation service follow a link to another section of the web site, access an another web site, etc.

Embodiments presented herein allow a user to access web data through a mobile device via a phone service, rather than via a cellular data network. The navigation service performs various NLP techniques to evaluate user commands and web page content to provide voice-based web navigation for the user. Advantageously, such an approach allows users to avoid exceeding data use limits. This approach also provides other practical benefits, e.g., in situations where the user does not have a reliable data signal but still has a reliable phone communication signal or where the user is discouraged from mobile web browsing, such as while driving a car.

FIG. 1 illustrates an example computing environment 100, according to one embodiment. As shown, the computing environment 100 includes a mobile device 105 and a navigation server 110. The mobile device 105 may generally be a cell phone, tablet, or other portable device that includes a both a cellular data and voice connection. A user may make phone calls as well as access a provider network 115. The provider network 115 is a cellular data network of a telecommunications provider. The provider network 115 itself is connected to a network 120, e.g., the Internet.

The mobile device 105 includes a web browser 107 and a monitor application 109. The user may access web sites via the web browser 107 or some other mobile application on the mobile device that allows the web user to view web data (e.g., applications that act as an "skin" for a particular website). In one embodiment, the telecommunications provider may limit how much data use users can access over a given period, e.g., five gigabytes of data per month. If the user exceeds this limit, then the telecommunications provider can prevent the user from accessing additional data via the network 115. The provider can also charge extra fees for exceeding the limit.

The monitor application 109 executes on the mobile device 105. The monitor application 109 may include one or more event listeners that track how much data volume has been consumed by the mobile device 105 over the network 115. In one embodiment, the monitor application 109 may notify the user that the mobile device 105 is approaching a specified data limit. Further, the prompt may ask the user whether to dial a phone number connecting to a voice-based web navigation service. Of course, the user can initiate a call to the web based navigation service by request as well, regardless of whether a user is nearing a data limit.

The navigation server 110 handles sessions between the mobile device 105 and the voice-based web navigation service. The navigation server 110 includes a navigation application 112. The navigation application 112 may retrieve website data. The website data may include unstructured text representing content of a current web page. The unstructured text may include headers, links, text content, and the like. The navigation application 112 may apply a variety of natural language processing (NLP) techniques, such as lexical and semantic analysis, to characterize various portions of the website, e.g., whether given text corresponds to a link, whether a word is similar or related to another word, whether the text corresponds to a header, etc. Further, such analysis allows the navigation application 112 to identify topics based on the content of the unstructured text, regardless of the page structure provided.

Analyzing a web page allows the navigation application 112 to provide a navigable voice interface for the user. The navigation application 112 can, over a phone connection, present the user with a menu of navigable options. For example, assume that the user is accessing a front page of a news website. The front page includes a listing of section headers, such as World, National, Politics, Business, Opinion, etc. Further, the front page also includes one or more article previews. The previews may include the title of the article and a snippet of article text (e.g., the first paragraph of the article, a brief summary of the article, etc.). After NLP processing, the navigation application 112 may present a list of sections to the user. In turn, the user can provide a voice command, e.g., "Go to world news." The navigation application 112 can then apply voice recognition and NLP techniques to identify the command ("Go to") and the target of the command ("world news"). Based on the NLP techniques, the navigation application 112 may identify a matching location of the page based on the identified target. As a result, the navigation application 112 may determine that the user desires to follow a link to the World section on the front page. Further, the navigation application 112 may identify matching topics specified in the request, e.g., "Is there any news about the Senate?"

In one embodiment, the navigation server 110 includes a deep question answering (QA) computer system, and the navigation application 112 is a deep QA application. The navigation application 112 may include various pipelines used for stages of text analysis and identifying answers to match to questions. Stages can include text extraction, parsing, content analysis, question analysis, etc.

Figure 2:
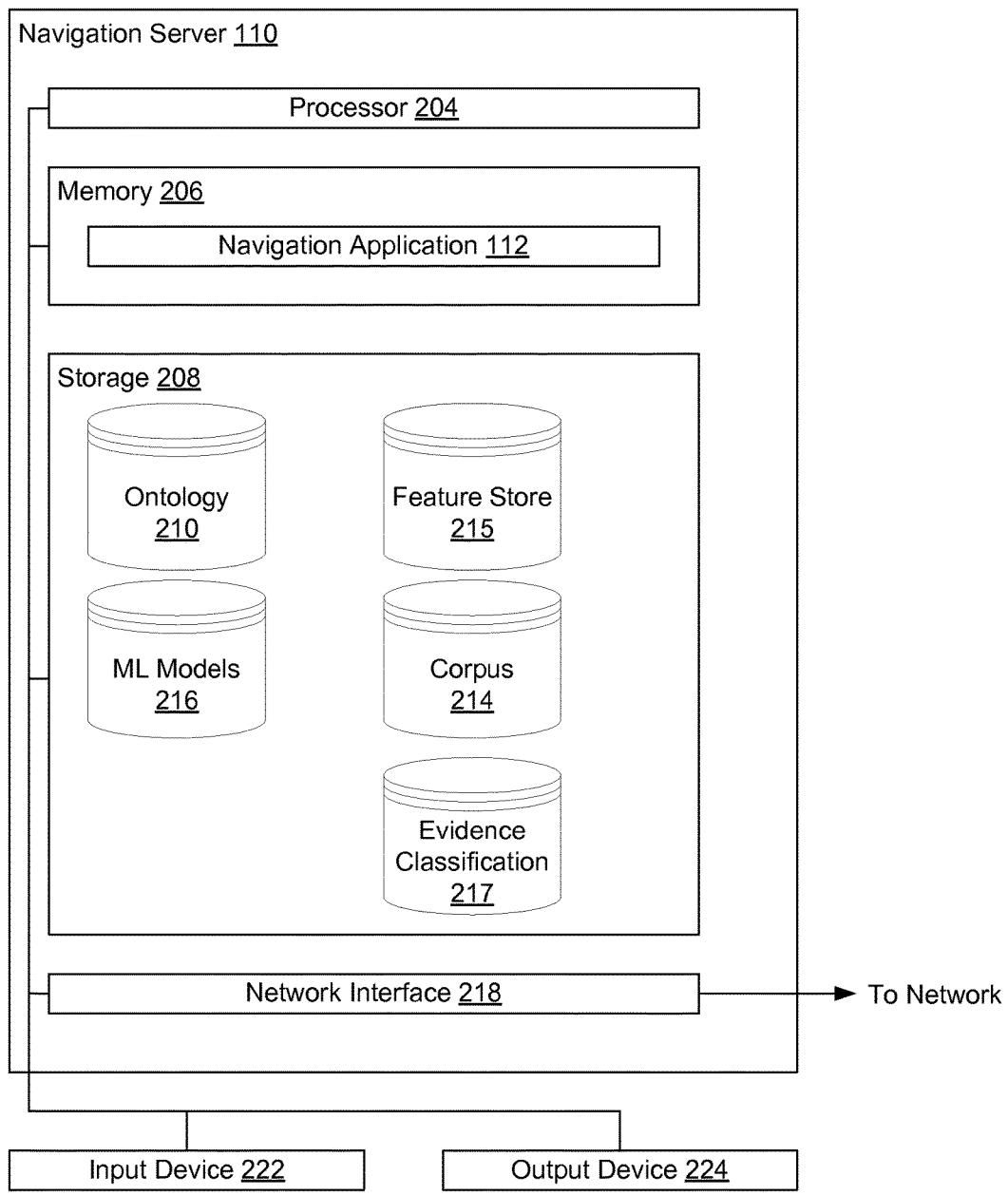
FIG. 2 further illustrates the navigation server described relative to FIG. 1, according to one embodiment.

FIG. 2 further illustrates the navigation server 110, according to one embodiment.

The navigation server 110 generally includes a processor 204 connected via a bus 220 to a memory 206, a network interface device 218, a storage 208, an input device 222, and an output device 224. The navigation server 110 is generally under the control of an operating system. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. Similarly, the memory 106 may be a random access memory. While the memory 206 is shown as a single identity, it should be understood that the memory 206 may comprise a plurality of modules, and that the memory 206 may exist at multiple levels, from high speed registers and caches to lower speed but larger DRAM chips. The network interface device 218 may be any type of network communications device allowing the navigation server 110 to communicate with other computers via the network 115.

The storage 208 may be a persistent storage device. Although the storage 208 is shown as a single unit, the storage 208 may be a combination of fixed and/or removable storage devices, such as fixed disc drives, solid state drives, removable memory cards, optical storage and network storage systems.

As shown, the memory 206 contains the navigation application 112, which is an application generally configured to provide a deep question answering (QA) system. One example of a deep QA system is Watson, by the IBM Corporation of Armonk, N.Y. A user may submit a case (also referred to as a question) to the application 112, which will then provide an answer to the case based on an analysis of a corpus of information. In the present context, a question may correspond to a voice command for navigating a web site, such as "Go to XYZ News," "Tell me how the Vikings did last night," or "Read me the top ten articles." The navigation application 112 may execute a pipeline to generate a response to the question, which is returned to the user. The navigation application 112 may further be configured to classify questions (e.g., follow a page link, read a subset of page content, go to another website, etc.), identify features highly relevant to generating a correct response to the questions, and store the resulting relationships for later use.

The navigation application 112 may further be configured to perform partial or parallel pipeline execution. For example, if a class of question has been identified as having a feature highly predictive of a correct answer, and a candidate answer for a question received by the navigation application 112 does not contain the feature, the navigation application 112 might not process that candidate answer to improve performance and conserve resources. Finally, the navigation application 112 may monitor evidence underlying relevant features for changes. If a change is detected, and the navigation application 112 believes that the change may impact a generated answer, the navigation application 112 may reprocess the question to ensure that a correct response is provided. Additionally, the navigation application 112 may generate new questions, based on the changed evidence, to determine whether the answer changed along with the evidence.

As shown, storage 208 contains the ontology 210, corpus 214, feature store 215, machine learning (ML) models 216, and evidence classification 217. The ontology 210 provides a structural framework for organizing information. An ontology formally represents knowledge as a set of concepts within a domain, and the relationships between those concepts. The corpus 214 is a body of information used by the navigation application 112 to generate answers to cases. Generally, the corpus 214 may be content of a web page being navigated through. Feature store 215 stores a mapping between question context and features which are highly predictive in generating a response to the question, such that the features may be identified when processing additional questions containing the same context. If the features are not present in candidate answers for the question, processing of those candidate answers by the navigation application 112 may be skipped to improve performance and efficiency. ML models 216 are models created by the navigation application 112 during the training phase, which are used during a runtime pipeline to score and rank candidate answers to cases based on features previously generated for each answer. Evidence classification 217 stores relationships between evidence from the corpus 214, the question context, and the predictive features.

Based on these stored relationships, the navigation application 112 may monitor the underlying evidence for a change. If a change is detected, and the navigation application 112 determines that the change undermines a degree of confidence in response generated using the evidence, the navigation application 112 may reprocess the questions, or alert users to the change. Although depicted as a database, ontology 210, corpus 214, feature store 215, ML models 216, and evidence classification 217 may take any form sufficient to store data, including text files, XML data files, and the like. In one embodiment, the ontology 210 is part of the corpus 214. Although depicted as residing on the same computer, any combination of the navigation application 112, the ontology 210, corpus 214, feature store 215, ML models 216, and evidence classification 217 may reside on the same or different computers.

The input device 222 may provide a keyboard and/or a mouse, etc. The output device 224 may be any conventional display screen. Although shown separately from the input device 222, the output device 224 and input device 222 may be combined. For example, a display screen with an integrated touch-screen may be used.

Figure 3:
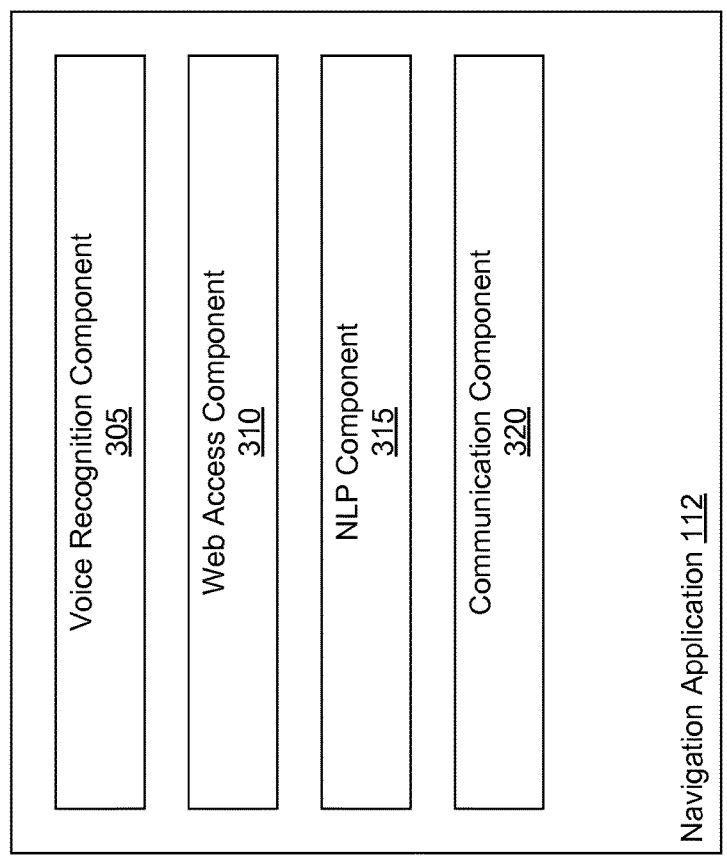
FIG. 3 further illustrates the navigation application described relative to FIGS. 1 and 2, according to one embodiment.

FIG. 3 further illustrates the navigation application 112, according to one embodiment. As shown, the navigation application 112 includes a voice recognition component 305, a web access component 310, a NLP component 315, and a communication component 320.

In one embodiment, the voice recognition component 305 analyzes voice commands spoken by a user. In particular, the voice recognition component 305 receives navigation requests from the mobile device 105 over the provider network 115. The voice recognition component 305 converts the voice input to text used by components in the navigation application 112. For example, as described below, the NLP component 315 can analyze the text input to identify particular commands, topics, targets, and concepts, referenced in the text and targets.

In one embodiment, the web access component 310 extracts unstructured text of a given web page. The web page may be accessed prior to the user contacting the service. That is, when the monitor application 109 detects that the mobile device 105 is approaching a specified data limit, e.g., while the user is browsing a web page on the web browser 107 (or on some other mobile application that provides web data), the monitor application 109 prompts the user on whether to dial into the navigation server 110. If the user selects to continue by using voice navigation, the monitor application 109 may send the URL of the relevant to the web access component 310. Further, the user may also specify a desired website using a voice command, e.g., "Go to <website>.com."

In one embodiment, the NLP component 315 performs NLP techniques (e.g., parsing, semantic analysis, structural analysis, and so on) to evaluate web page content. For example, the NLP component 315 may identify features and structure, such as links, headers, and content using the NLP techniques. Further, the NLP component 315 uses lexical and semantic analysis to identify concepts associated with the content.

Further, once the web page has been evaluated, the NLP component 315 can speech (converted to text by the voice recognition component 305) to identify navigation commands or requests for content. For instance, the NLP component 315 may parse the converted text to identify a type of command, such as whether the user wants to read content, follow a link, or go to a different website. The NLP component 315 may also identify a target concept specified, such as topical content within the web page or a different website. If the target is a desired topic provided in the website, the NLP component 315 can evaluate the content with the actual web page content using NLP. For instance, the NLP component 315 can disambiguate terms, identify potentially matching content, and score the potential matches.

For example, assume that the navigation application 112 is providing voice-based navigation for the sports section of a news web site. The navigation application 112 may analyze the webpage to identify front page articles, sections, and a table of recent scores for various college basketball teams. Assume a user is connected to the navigation application 112 through the mobile device 105. Further, assume the user makes a command requesting, "What are the scores for the last Michigan game?" The NLP component 315 may identify, based on NLP techniques, that the command is related to sports and to scores (or some concept of outcomes). More particularly, the NLP component 315 can identify that the command corresponds to a request to identify scores listed on the page for the most recent Michigan game. The NLP component 315 can then identify features and content of the webpage that refer to such a topic. The NLP component 315 may score candidate matches (e.g., "University of Michigan" and "Michigan State University") based on confidence.

In one embodiment, the communication component 320 provides a voice-based interface to the user for navigating the web page. The communication component 320 generates and presents audio based on requested content for the user. Continuing the previous example, in the event of ambiguities or results having a high confidence scores (e.g., "University of Michigan" and "Michigan State University"), the communication component 320 may generate an audio prompt requesting the user to select from one of the results.

Figure 4:
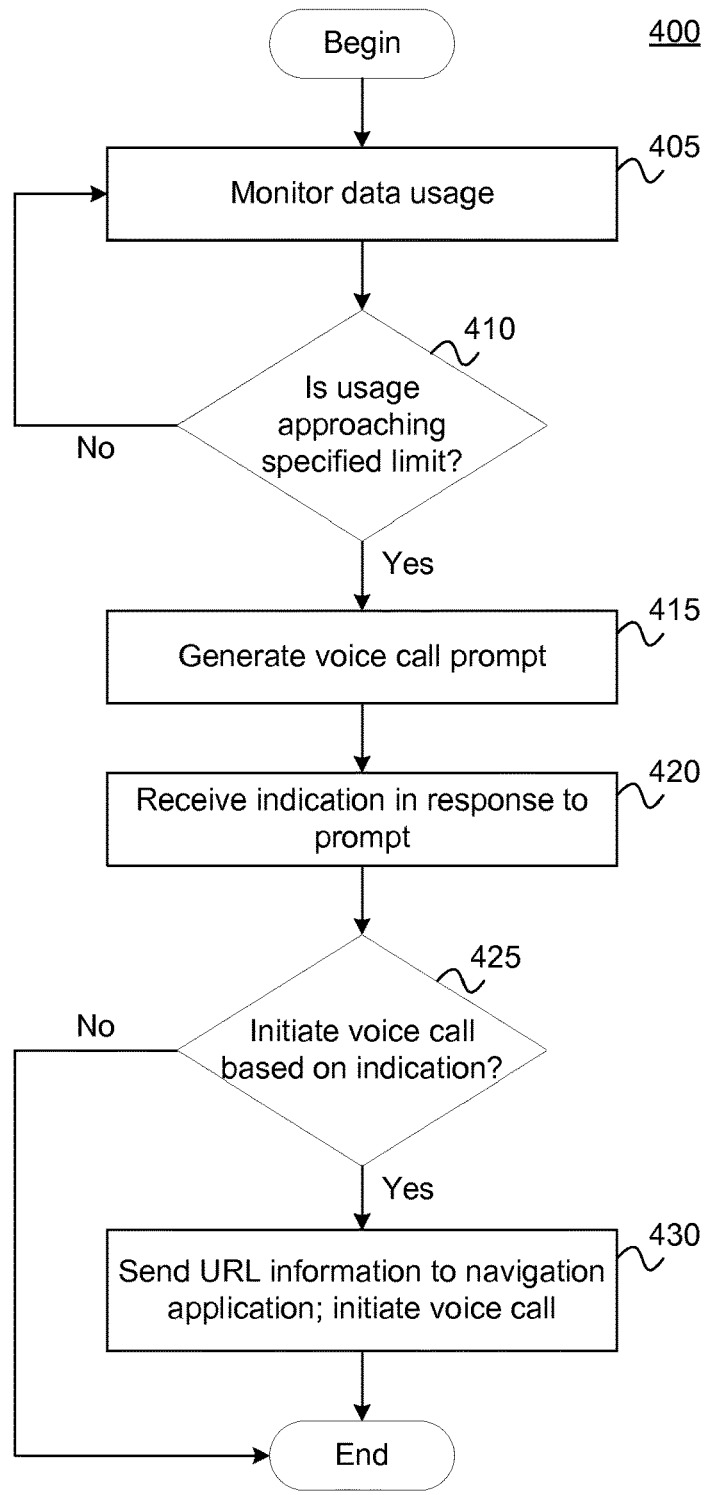
FIG. 4 illustrates a method for switching from a data-based web context to a call-based web context, according to one embodiment.

FIG. 4 illustrates a method 400 for switching from a data-based web context to a call-based web context, according to one embodiment. At step 405, the monitor application 109 tracks usage (e.g., of data accessed through a web browser 107 or some mobile application that similarly provides web viewing, such as a "skin") on the mobile device 105. At step 410, the monitor application 109 determines whether the data usage is approaching a specified limit. To do so, the monitor application 109 may execute event listeners in the background that detect when the mobile device 105 is accessing data over the cellular data network. The event listeners may notify the monitoring application 109 when data is approaching a given limit.

If so, then at step 415, the monitor application 109 generates a prompt to present to the user. The prompt asks whether the user would like to dial a number connecting the mobile device 105 to the navigation server 110 for voice-based web navigation. The user can avoid incurring additional data usage by switching to the voice-based web navigation.

At step 420, the monitor application 109 receives an indication in response to the prompt. At step 425, the monitor application 109 determines whether to initiate a voice call based on the indication. If the indication is affirmative, then the monitor application 109 retrieves a URL of the web page currently being browsed (e.g., in the web browser 107 or some other mobile application that provides web data for viewing) to the navigation application 112. The monitor application 109 then sends URL information and identifying information (e.g., a phone number or some other identifier associated with the user) to the navigation application. The monitor application 109 then initiates the voice call from the mobile device 105 to the navigation server 110.

Figure 5:
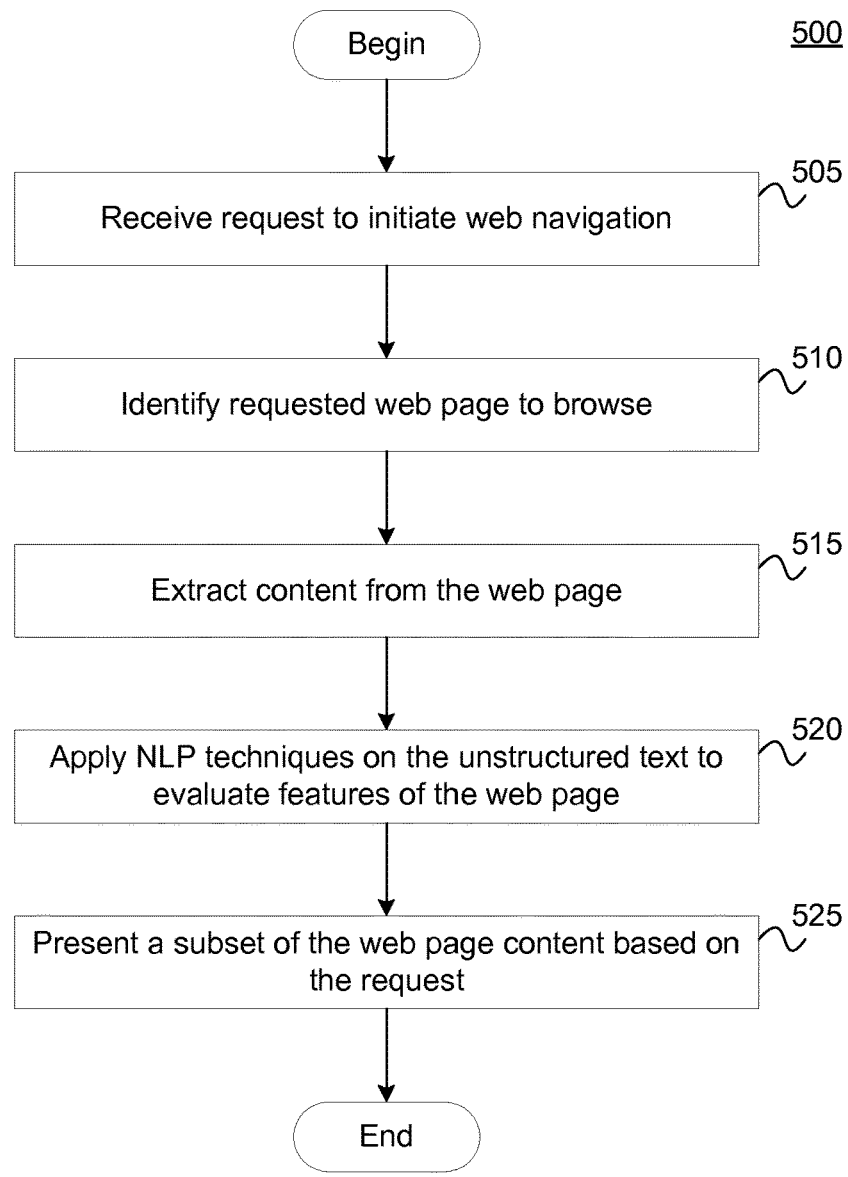
FIG. 5 illustrates a method for initializing a call-based web context, according to one embodiment.

FIG. 5 illustrates a method 500 for initializing a call-based web context, according to one embodiment. When the user dials in to the navigation service using the mobile device 105, the navigation application 112 may initiate the call-based web context. At step 505, the communication component 320 receives a request to initiate voice-based web navigation. That is, the user has dialed into the service. The navigation application 112 can identify a given user based on a phone number (or other identifier associated with the user) of the mobile device 105.

At step 510, the web access component 310 identifies a requested web page to browse. The web access component 310 may identify a web site that was being browsed by the user prior to the telephone call. As stated, after the user agrees to initiate the voice call, the monitor application 109 may retrieve the URL of the currently browsed website from the web browser 107 and send the URL to the navigation application 112.

At step 515, the web access component 310 extracts content from the requested web page. The web access component 310 may retrieve HTML code and unstructured text content from the web page currently being browsed. At step 520, the NLP component 315 performs natural language processing to identify features of the website. By doing so, the NLP component 315 may identify links, content, and structure of the website to subsequently present for the website. For example, for a news web site, the NLP component 315 may identify a structure based on headers and sections making up the web site.

At step 525, the communication component 320 presents a subset of the web page content based on the request. To do so, the communication component 320 may generate audio that dictates that website content within the subset. Initially, the subset may correspond to an overarching structure of the website. Continuing the previous example of the news web site, the communication component 320 may generate audio reading the sections of the news web site. Note, the communication component 320 may identify the sections based on concepts associated with a given headline (i.e., the news sections do not need to be identified in advance). From there, the user can specify a command for navigating one of the sections, e.g., "Go to the National section." The communication component 320 can in turn follow a link on the website corresponding to the national section. Further, the navigation application 112 may perform the same NLP techniques to extract and identify features of the subsequently accessed web page. Doing so provides continuous web navigation over a cellular voice connection.

Figure 6:
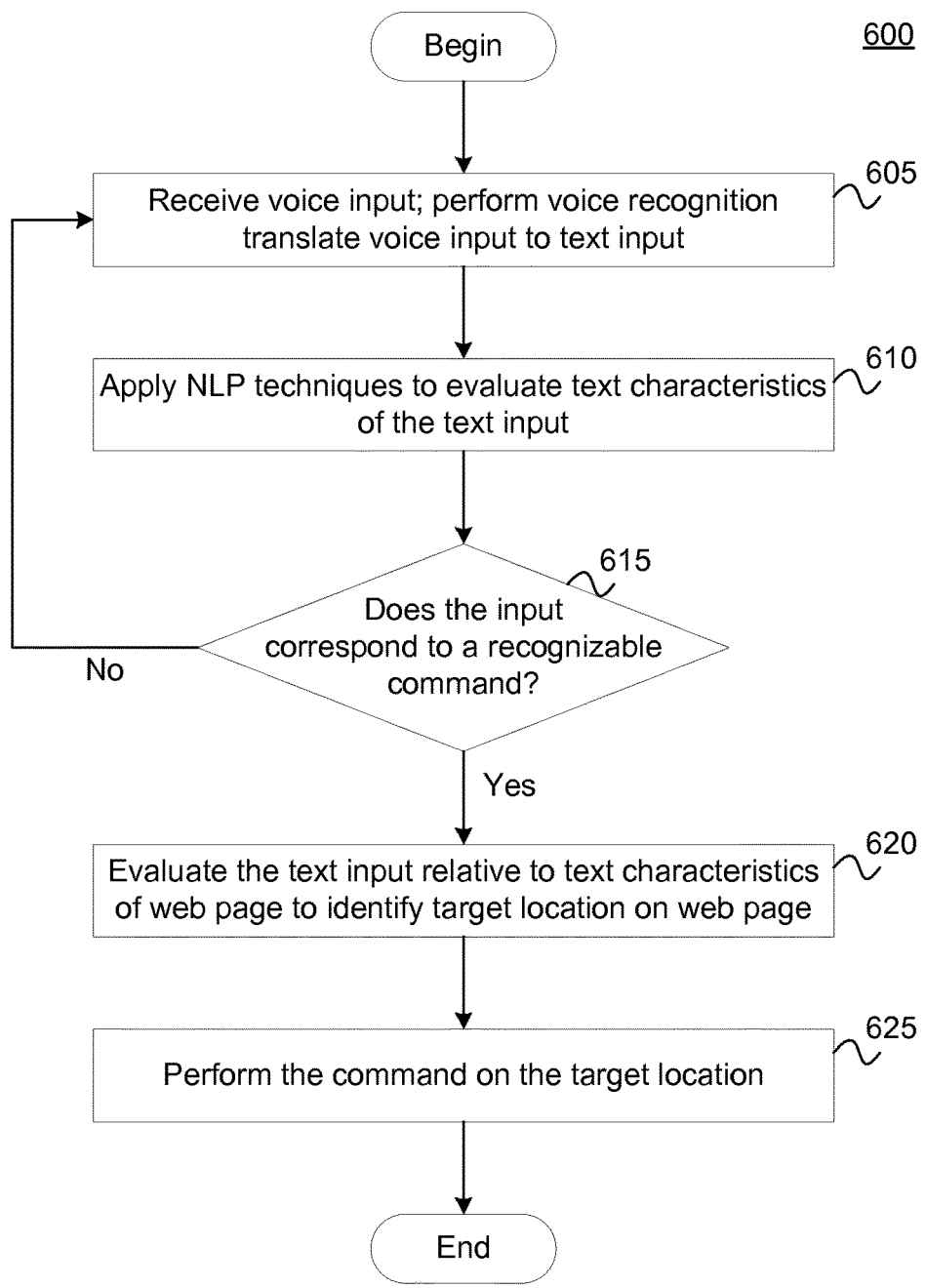
FIG. 6 illustrates a method for navigating a call-based web context, according to one embodiment.

FIG. 6 illustrates a method 600 for navigating a call-based web context during a cellular voice connection between the mobile device 105 and the navigation server 110, according to one embodiment. In this case, assume that the navigation application 112 is currently browsing the front page of a news website. At step 605, the communication component 320 receives voice input from the user. The voice input might correspond to a command for navigating the voice-based web interface. The voice recognition component 305 translates the voice input to text input.

At step 610, the NLP component 315 performs NLP on the text input. The NLP component 315 does so to identify any potential commands and website targets in the text input (e.g., links, areas of the webpage, terms used in the webpage, and so on). At step 615, the NLP component 315 determines whether the input corresponds to a recognizable command. Examples of a recognizable command are following a link on the web page (e.g., "Go to <link>" or "<link>") or reading content (e.g., "Read <article title>" or "<article title>"). Further, recognizable commands can be questions that are based on identified content and features on the web page, e.g., "Is the Dow up or down today?"

If the input corresponds to a recognizable command, then at step 620, the NLP component 315 evaluates the text input relative to the web page content to identify a target location on the web page. Further, the NLP component 315 may identify candidate matches corresponding to a desired target and compute a confidence score for each candidate. At step 625, the communication component 305 performs the command at the target location. For example, the communication component 305 may generate audio corresponding to the content at the target location. The target location may be one of the matches having the highest confidence score. In the event that more than one of the matches have relatively high (or equal) confidence scores, the communication component 305 may generate audio prompting the user to select one of those matches.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the navigation application 112) or related data available in the cloud. For example, the navigation application 112 could execute on a computing system in the cloud and provide a voice-based web navigation interface. In such a case, the navigation application 112 could extract and analyze webpage content and store the analyzed content at a storage location in the cloud. Doing so allows a user to access this information from any computing system attached to a network connected to the cloud (e.g., the Internet).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:

receiving, via a cellular voice connection initiated by a mobile device, a first voice command representing a request to return content of a webpage without incurring cellular data usage, the webpage having one or more topics, wherein the cellular voice connection is initiated as an outgoing call from the mobile device in response to the mobile device meeting a cellular data usage limit;

receiving, from the mobile device, a uniform resource locator (URL) for the webpage, wherein the URL is extracted from a web browser on the mobile device and utilized by an application program on the mobile device;

identifying, based on a natural processing language (NLP) evaluation of the webpage, one or more candidates from the topics of the webpage that match the content specified in the request by:

classifying, via execution of a pipeline in a deep question-answering (QA) system, the first voice command as a question to the deep QA system, identifying, via the execution of the pipeline, a context for the question, retrieving one or more features from an electronic storage, based on the context, wherein the features are predictive in determining a response to the question, and determining the one or more candidates based on the one or more features;

determining a confidence score for each candidate based on the NLP evaluation;

prompting an audio indication requesting a selection from at least two of the candidates, wherein the confidence score of the at least two of the candidates is equal;

receiving a second voice command representing the selection from the at least two of the candidates; and returning, via the cellular voice connection, an audio indication of the content corresponding to the selected candidate.

2. The method of claim 1, wherein the request specifies a uniform resource locator (URL) for the webpage.

3. The method of claim 2, further comprising, prior to receiving the first voice command:

accessing the webpage via the specified URL;

extracting unstructured text from the webpage; and identifying the topics of the webpage.

4. The method of claim 1, further comprising, prior to identifying the one or more candidates:

converting the second voice command to text input.

5. The method of claim 4, wherein identifying one or more features of the webpage that match the content specified in the request comprises:

performing one or more NLP techniques to the converted text input to identify a specified command and a target indicating a location within the webpage; and identifying the content based on the target.

6. The method of claim 1, wherein the audio indication of the content is a prompt requesting a selection of one or more locations to navigate within the webpage.

7. The method of claim 1, further comprising:

tracking cellular data usage by the mobile device;

determining that the mobile device is approaching the cellular data usage limit;

generating a notification to the user, in response to the determination that the mobile device is approaching the cellular data usage limit;

generating a prompt to the user, in response to a determination that the mobile device has met the cellular data usage limit; and receiving an indication in response to the prompt to the user, wherein the cellular voice connection is initiated in response to receiving the indication.

* * * * *